United States Patent [19]

Kawamoto et al.

[11] Patent Number: 4,536,853

[45] Date of Patent: Aug. 20, 1985

[54] MULTIPLE WAVE GENERATOR

[75] Inventors: Kinji Kawamoto, Yahata; Masao Tsukamoto, Katano; Kazuhiro Murase, Hirakata; Tetsuhiko Kaneaki, Ashiya; Masataka Nikaido, Takatsuki, all of Japan

[73] Assignee: Matsushita Electric Industrial Co. Ltd., Kadoma, Japan

[21] Appl. No.: 434,709

[22] Filed: Oct. 15, 1982

[30] Foreign Application Priority Data

Oct. 15, 1981 [JP] Japan ................. 56-165189

[51] Int. Cl.$^3$ .................. G06F 1/02; G06F 7/38; G01H 1/00
[52] U.S. Cl. .................... 364/718; 84/1.01; 364/723
[58] Field of Search ............... 364/718–723; 328/178, 180; 84/1.03, 1.1

[56] References Cited

U.S. PATENT DOCUMENTS

| | | | |
|---|---|---|---|
| 3,676,655 | 7/1972 | Anacona | 364/723 |
| 4,119,005 | 10/1978 | Kondo et al. | 84/1.01 |
| 4,249,447 | 2/1981 | Tomisawa | 84/1.01 |
| 4,297,933 | 11/1981 | Nishimoto | 84/1.01 |
| 4,424,730 | 1/1984 | Ezawa | 364/718 |

Primary Examiner—James D. Thomas
Assistant Examiner—Dale M. Shaw
Attorney, Agent, or Firm—Wenderoth, Lind & Ponack

[57] ABSTRACT

A multiple wave generator for an electronic musical instrument which has a wave data memory storing plural data samples of a wave shape, a wave address register storing wave address data partially designating sampled data in the wave data memory, a difference address register storing difference address data which specifies incremental address amount, a wave address calculator adding the wave address data to the difference address data and writing into the wave address register, the summed address data being separated into wave memory address data and partial address data, and a wave calculator. The wave memory address data, which are part of the wave address data, are applied to the wave data memory for reading out one data sample, and the one data sample and the partial address data are applied to the wave calculator for calculating interpolated wave sample data corresponding to the wave memory address and the partial address.

9 Claims, 14 Drawing Figures

MULTIPLE WAVE GENERATOR

BACKGROUND OF THE INVENTION

1. Field of the Invention

This invention relates to an electronic musical instrument and more particularly to a novel musical wave generator which generates plural waves having different frequencies using interpolation calculation of wave sample data.

2. Description of the Prior Art

A conventional wave generator for an electronic musical instrument utilizing digital systems has a digtial memory storing samples of a complex wave shape of a musical tone. The samples in the memory are read out by a clock pulse and converted to analog signals. The analog signals have the shape of the musical tone. The analog signals are multiplied by an envelope signal. Such systems have several problems.

The first problem is wave calcuation. Timbre of musical tone is determined by level of harmonics. A complex wave shape of the tone can be calculated by inverse Fourier calculation of the level data. When the level data are changed from one timbre to another, the inverse Fourier calculation must be executed. This calculation takes too much time. So, an electronic musical instrument cannot produce a new timbre immediately after a timbre switch is operated.

The second problem is that timbre does not change during onset and end of the tone. To change the timbre, the inverse Fourier calculation must be done all the time, but speed of the calculation is not fast enough, so this is impractical. Therefore, good sounds having realistic image of a trumpet or a violin cannot be generated.

The third problem concerns clock signal frequency. For generating musical scales C, C♯, D, ...., B, twelve clock frequencies are prepared and one of them is used as clock signal frequency. This method is convenient for monophonic musical instruments, but not for polyphonic musical instruments. When C and C♯ should be generated, these two frequencies are different from each other, so a single clock frequency system cannot be adopted. The system becomes too complicated, because synchronizing two frequencies of C and C♯ is necessary.

The fourth problem is that it is hard to obtain frequency resolved precisely at will unless very large memory is prepared.

SUMMARY OF THE INVENTION

It is therefore an object of the present invention to provide a multiple wave generator which can generate plural waves having different frequencies.

Another object of the present invention is to provide a wave generator which utilizes an interpolating calcuation of wave sample data for reduction of size of wave memory avoiding degradations in accuracy of frequency and wave shape, in other words, S/N.

A further object of the present invention is to provide a wave generator which can be used for synthesizing very natural sounds having timbre change during onset and end of tones.

These and other objects and features of the present invention will be made clear from the following detailed description of the invention considered together with the accompanying drawings wherein:

DESCRIPTION OF THE PREFERRED EMBODIMENT

Figure 1:
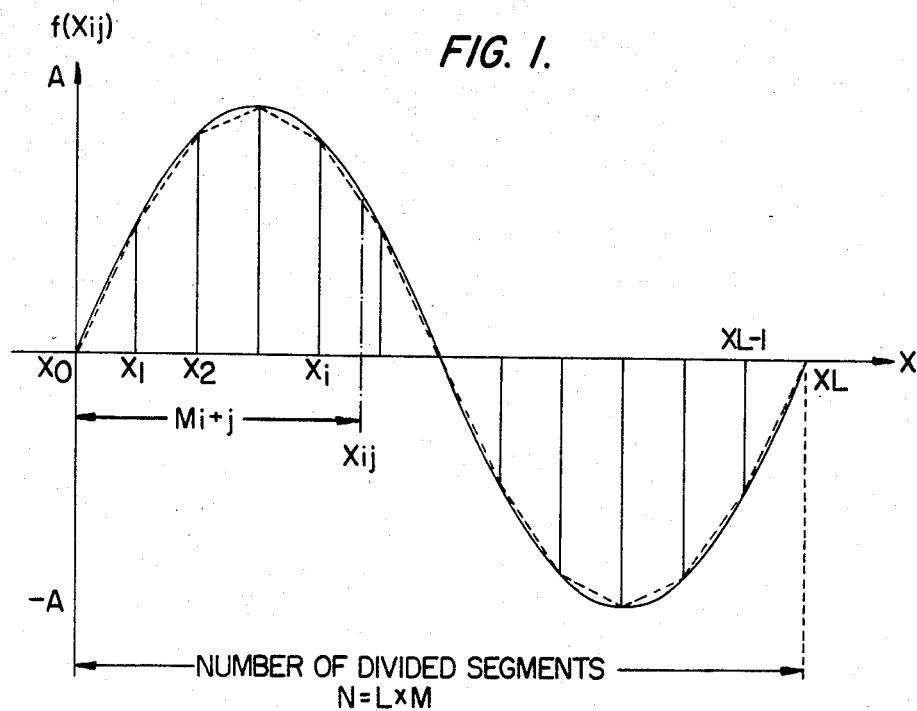
FIG. 1 is a wave form diagram showing the principle of wave generation of the present invention.

FIG. 1 shows an example of a sinusoidal wave shape. Referring to FIG. 1, a solid line shows an exact sinusoidal wave. A period of the wave is divided into N segments, wherein $N = L \times M$. N, L and M are positive integers, respectively. The period of the wave is divided by L and each of the points of division is denoted as $x_0$, $x_1, x_2, \ldots, x_i, \ldots, x_{L-1}$. There are M points in a section between $x_i$ and $x_{i+1}$. These M points are represented by $x_{ij}$, wherein $j = 0, 1, 2, \ldots, j, \ldots, (M-1)$. The points of N are represented by $x_{ij}$, wherein $i = 0, 1, 2, \ldots, i, \ldots, L-1, j = 0, 1, 2, \ldots, j, \ldots, M-1$. $x_i$ is equal to $x_{i0}$.

A phase of the period is $2\pi$ radians. A phase of the point $x_{ij}$ is represented by $\theta_{ij}$.

$$\theta_{ij} = (2\pi/N) \times (Mi + j) \quad (1)$$

The sinusoidal wave of FIG. 1 is represented by $$f(x_{ij}) = A \sin\left\{ \frac{2\pi}{N} (Mi + j) \right\}, \quad (2)$$

A is an amplitude of the sinusoidal wave.

The present invention intends to generate N samples of $f(x_{ij})$ from L samples of $x_{i0}$. $(N-L)$ samples of $x_{ij}(J \neq 0)$ are calculated by interpolation. A linear interpolation between $x_{i+1,0}$ and $x_{i,0}$ is represented by $$f(x_{ij}) = \{f(x_{i+1,0}) - f(x_{i,0})\} \frac{j}{M} + f(x_{i,0})$$

When $f(x_{ij})$ is sinusoid, $f(x_{ij})$ is $$f(x_{ij}) = A\left\{ \sin\frac{2\pi}{L}(i+1) - \sin\frac{2\pi}{L}i \right\}\frac{j}{M} + A\sin\frac{2\pi}{L}i. \quad (3)$$

In the following explanation, L is 2048 ($=2^{11}$) and M is 128 ($=2^7$). N=262144=$2^{18}$. Therefore, i, j and (ij) are represented by 11, 7 and 18 bits of binary numbers.

Figure 2:
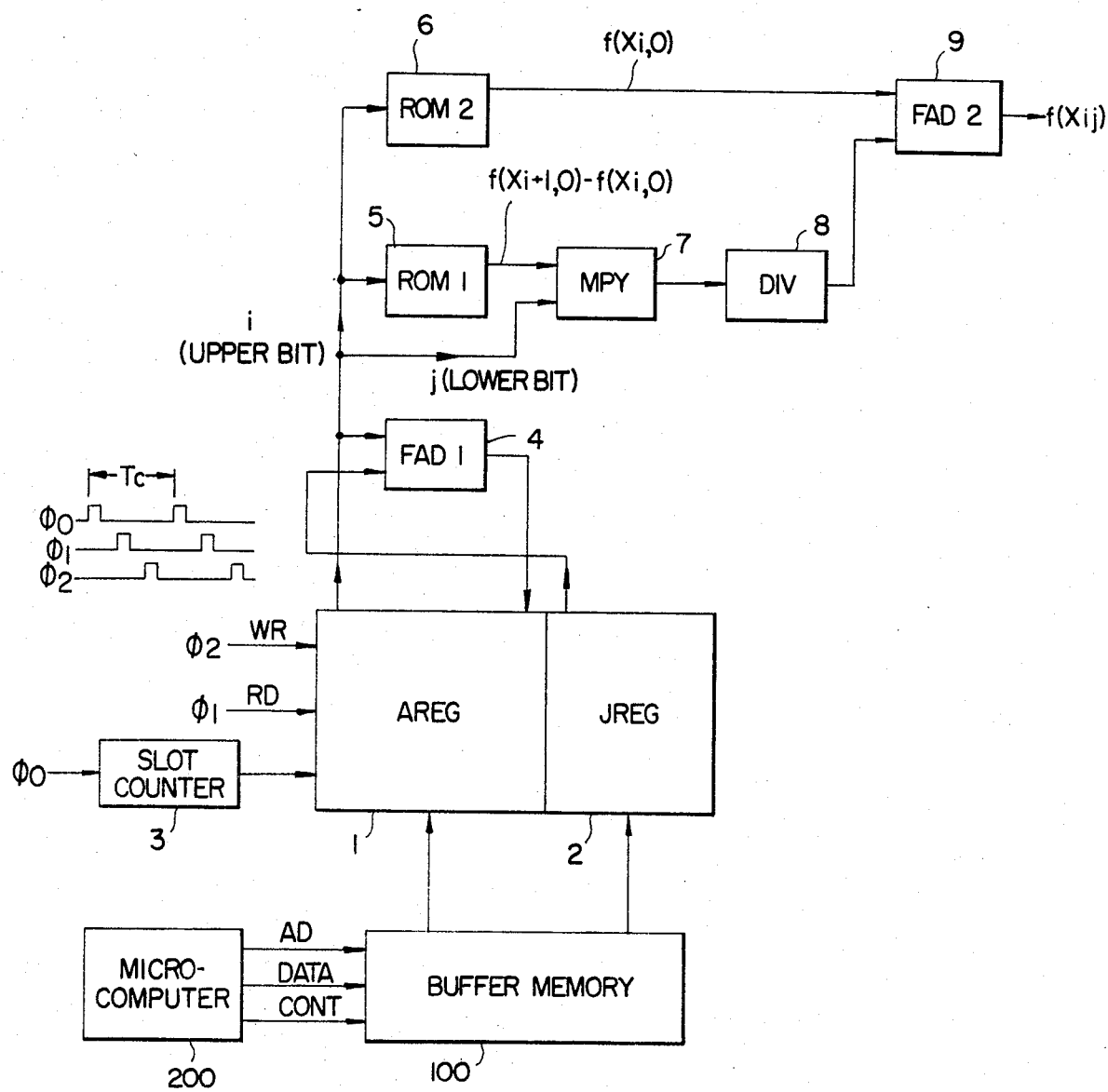
FIG. 2 is a block diagram of an embodiment of the present invention.

FIG. 2 shows an embodiment of the present invention. Referring to FIG. 2, 1 is a wave address register (AREG) and 2 is a difference address register (JREG). The wave address register 1 and the difference address register contain 72 read/write memories, respectively. Each word of the 72 memories is composed of 18 bits. A slot counter 3 counts to 72 and cyclically selects one of the 72 read/write memories. A clock signal $\phi_0$ is applied to the slot counter 3. A clock signal $\phi_1$ and $\phi_2$ are applied to the wave address register 1 and the difference address register 2. The clock signal $\phi_1$ is a read signal RD. This signal RD will read out contents of the memory designated by the slot counter 3. The clock signal $\phi_2$ is a write signal WR. When the WR signal is applied to the wave address register 1, a new address datum from a full adder (FAD1) 4 is written into the memory selected by the slot counter 3. The full adder (FAD1) 4 adds an output datum of the wave address register 1 and the difference address register 2, and applies a sum datum to the wave address register 1. These are an address calculating block.

The address calculating block adds the wave address datum $WA_p(nT)$ at nT and the difference address datum $D_p(nT)$ to produce $WA_p(nT+T)$ by the following equation.

$$WA_p(nT+T) = WA_p(nT) + D_p(nT) \quad (4)$$

T is a sample period. n is the number of samples per unit time. p is 0–71 and represents the number designating one of the 72 read/write memories. The period of clock signal $\phi_1$ is $T_c$. $72 \times T_c$ is equal to sample period T. The period of $\phi_0$ and $\phi_2$ is also $T_c$. A set of $\phi_0$, $\phi_1$, $\phi_2$ composes one time slot. During each time slot, the equation (4) is executed. 72 time slots will calculate the equation of (4) for p=0 to 71. The 72 contents of the wave address register 1 are incremented by $D_p(nT)$ (p=0−71), respectively.

An output datum of the wave address register 1 is applied to a wave data memory and a wave data calculator. The wave data memory is composed of the first wave data memory (ROM1) 5 and the second wave data memory (ROM2) 6. The ROM2 contains wave data $f(x_{i0})$.

$$f(x_{i0}) = A\sin\left(\frac{2\pi}{N} \times M \times i\right) \quad (5)$$
$$= A\sin\left(\frac{2\pi}{L}i\right)$$

wherein i=0, 1, 2, ..., i, ..., L−1. i is represented by an 11 bit binary number. So $f(x_{i0})$ are 2048 data samples. The ROM1 stores differential samples represented by the next equation.

$$\Delta f(x_{i,0}) = f(x_{i+1,0}) - f(x_{i,0}) \quad (6)$$
$$= A\left\{\sin\frac{2\pi}{L}(i+1) - \sin\frac{2\pi}{L}i\right\}$$
$$(i = 0, 1, 2, ..., i, ..., L-1)$$

$\Delta f(x_{i,0})$ are also 2048 data samples. Actually, the data $f(x_{i,0})$ and $\Delta f(x_{i,0})$ are digitized data.

The output datum of the ROM1 is applied to one input of a multiplier (MPY) 7. Another input terminal of the multiplier 7 receives a partial address j of the wave address datum. The output datum of the multiplier 7 is applied to a divider 8 and is divided by M. The output datum of the divider 8 is represented by the following equation.

$$\{f(x_{i+1,0}) - f(x_{i,0})\}\frac{j}{M} = A\left\{\sin\frac{2\pi}{L}(i+1) - \sin\frac{2\pi}{L}i\right\}\frac{j}{M} \quad (7)$$

The datum is added to the output of the ROM2 by a full adder (FAD2) 9. An output datum of the FAD2 can be represented as follows:

$$f(x_{ij}) = A\left\{\sin\frac{2\pi}{L}(i+1) - \sin\frac{2\pi}{L}i\right\}\frac{j}{M} + A\sin\frac{2\pi}{L}i \quad (8)$$

$f(x_{ij})$ is an approximation of a sinusoidal wave and is shown by a dashed line in FIG. 1. The dashed line is a sinusoidal wave interpolated linearly. The number L and M can be any positive integer mathematically. But practically L and M had better be powers of 2.

When L=2048 and M=128, L and M can be represented by binary numbers of 11 bits and 7 bits, respectively. (ij), i.e. (Mi+j), can be represented by an 18 bit binary number. The lower 7 figures (bits) of (mi+j) coincide with a binary representation of j. The upper 11 bits of (Mi+j) become i. The lower 7 bits can be used as a partial address. The upper 11 bits can be used as an address datum of ROM1 and ROM2. i and j can be separated very easily. The divider 8 can be a 7 bit shifter, because M is 128.

ROM1, the multiplier 7, the divider 8 and the full adder 9 compose a wave calculator executing linear interpolation. ROM1, which is a difference wave data memory, can be replaced by a subtractor taking the difference of adjacent wave samples.

Figure 3:
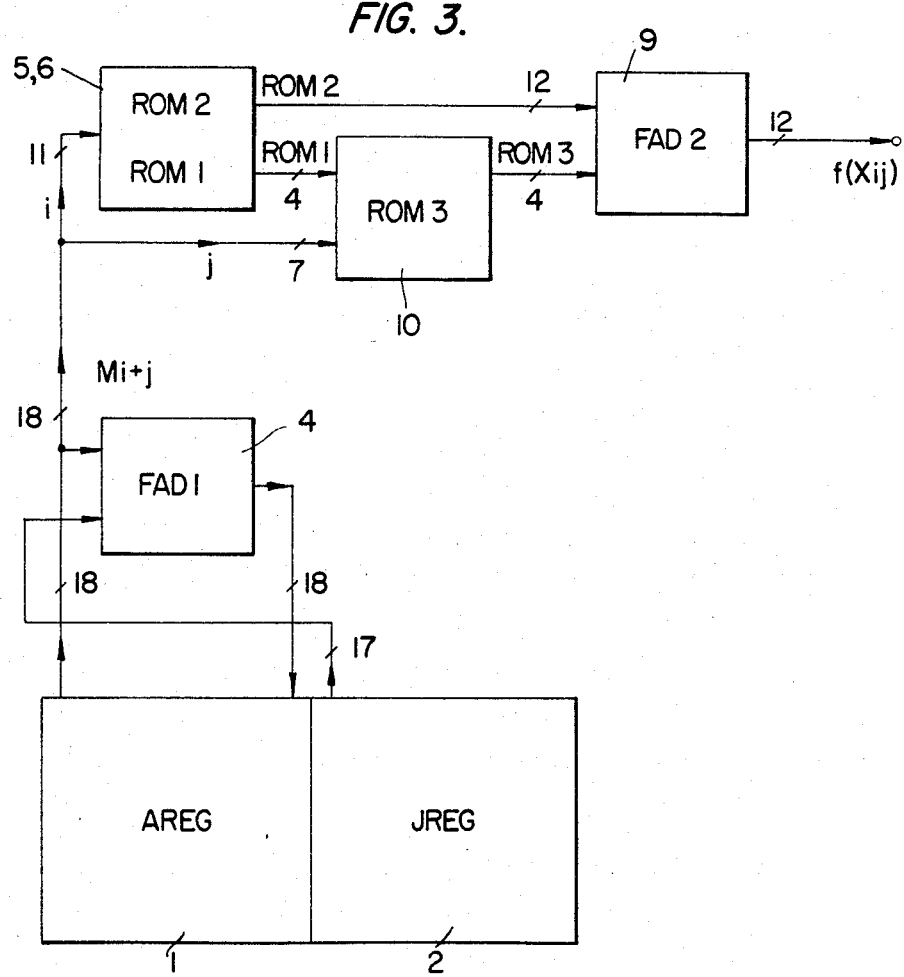
FIG. 3 is a block diagram of another embodiment of the present invention.

FIG. 3 shows another embodiment of the present invention. Referring to FIG. 3, ROM3 operates as the multiplier 7 and the divider 8 in FIG. 2. ROM1 stores the differential samples $\Delta f(x_{i0})$. When L is a very large number, $\Delta f(x_{i0})$ becomes small. M also becomes small. When the sample data stored in ROM1 are represented by 12 bits. A becomes 2047. The differential samples $\Delta f(x_{i0})$ can be represented by 4 bits including sign bit. On the other hand, j is 7 bits. Input data of ROM3 is (4+7) bits. When output of ROM3 is 4 bits datum, then size of ROM3 is $$2^{11} \times 4 = 2048 \times 4 = 8192 \text{ bits.}$$

The output datum of ROM3 is approximately $$\Delta f(x_{i0})(j/M)$$

Figure 4:
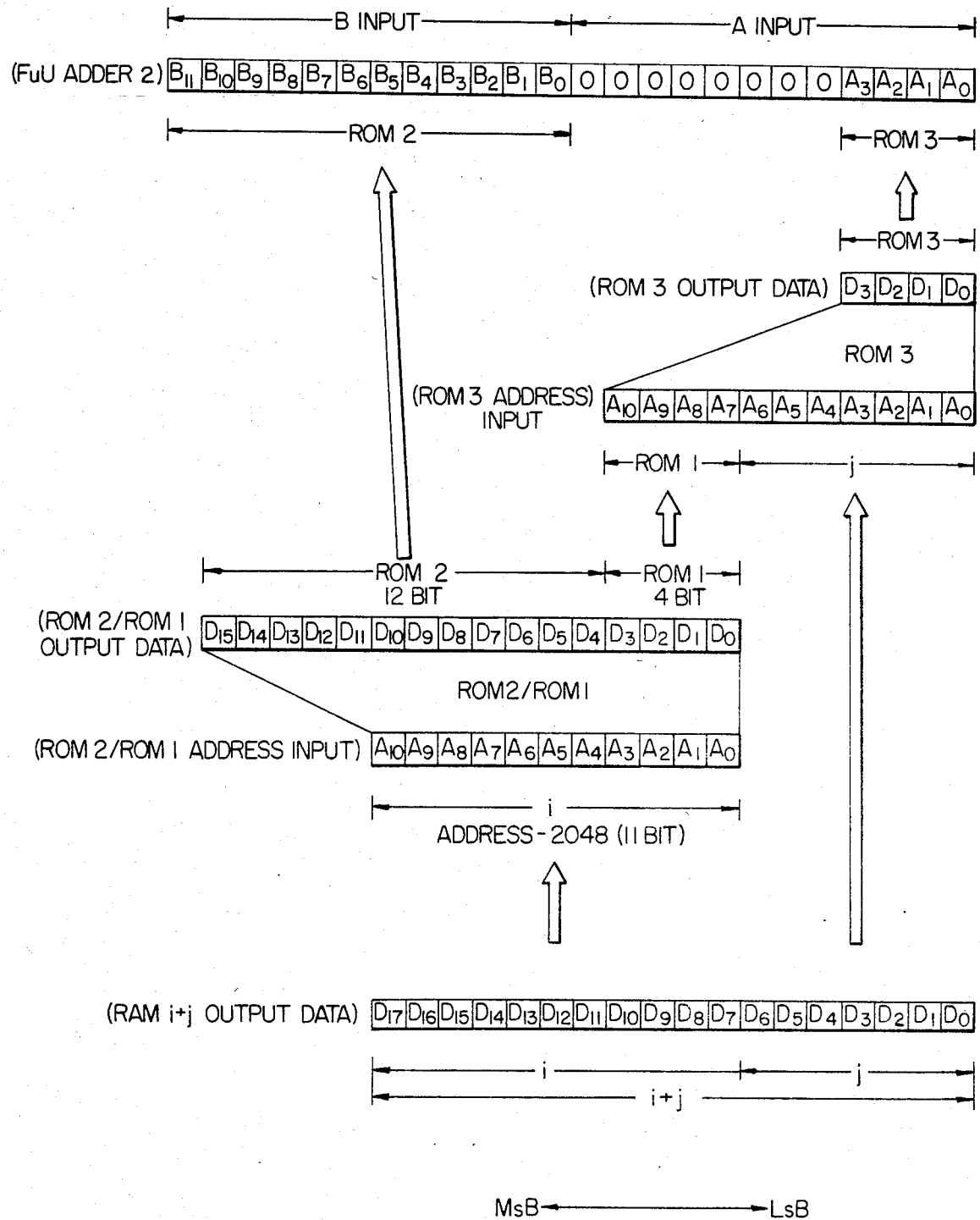
FIG. 4 is a process diagram of data conversion and calculation.

FIG. 4 shows word length of respective stages shown in FIG. 3. The wave address data (Mi+j) are separated into the wave memory address i and the partial address j. The wave memory address i is converted to the wave datum of ROM2 and the differential sample datum fo ROM1. The datum of ROM1 and j are converted to the output of ROM3. The output of ROM2 and ROM3 are added. ROM3 containing 8192 bits is smaller and simpler than the multiplier 7 and the divider 8.

The embodiments shown in FIG. 2 and 3 must generate wave samples $f(x_{ij})$ within clock period $T_c$. Cumulative delay time of ROM1, multiplier 7 and divider 8 must be less than the delay time of ROM2 in FIG. 2. Therefore, ROM1, multiplier 7 and divider 8 must operate very fast.

Figure 5:
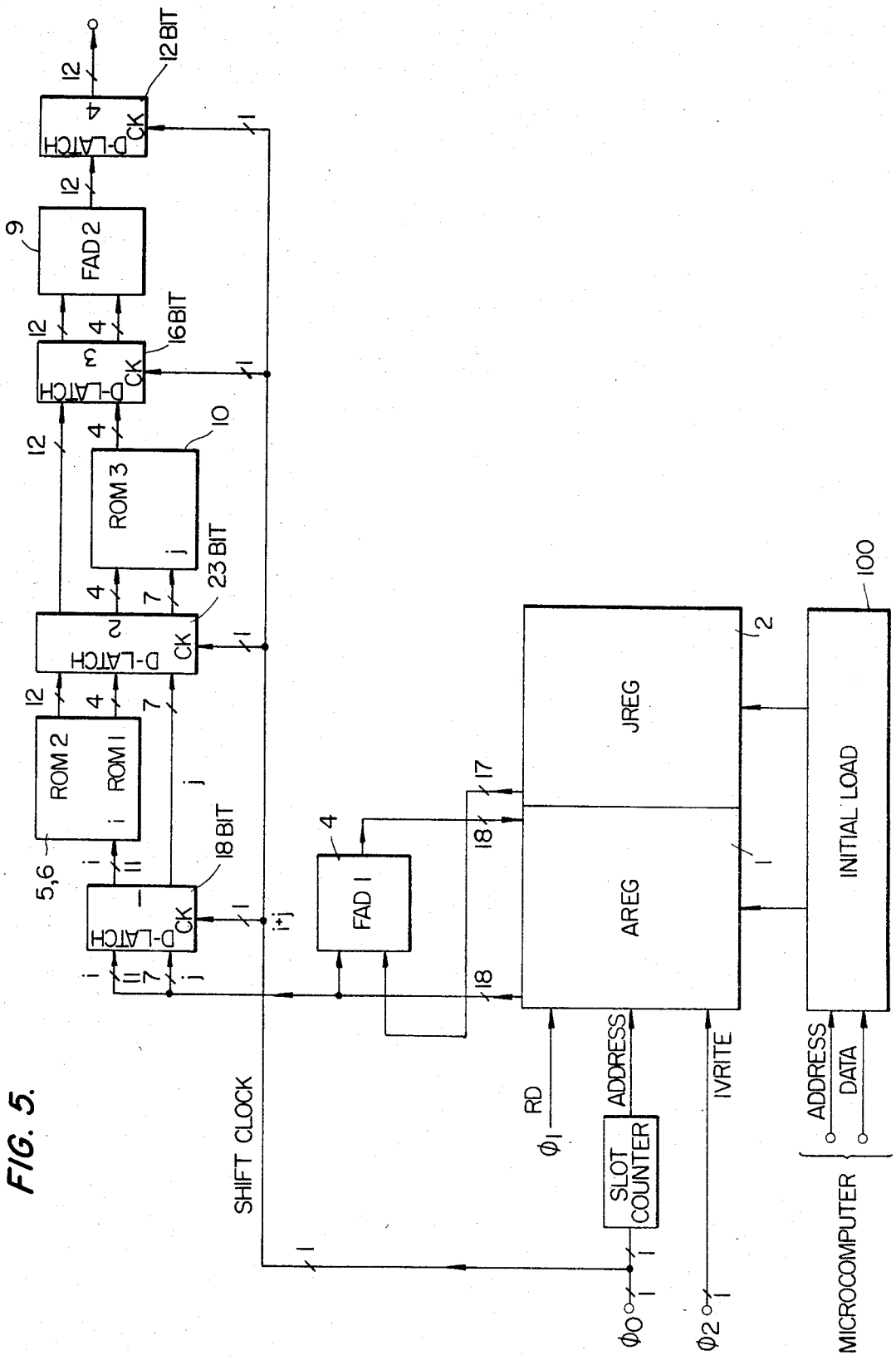
FIG. 5 is a block diagram of a further embodiment of the present invention.

FIG. 5 shows a pipe line structure. These are 4 D-latches before and behind ROM1, ROM2, ROM3 and full addter (FAD2) 9. The clock signal $\phi_0$ shifts data to subsequent stages. Each of ROM1, ROM2, ROM3 and the full adder 9 must put out data to the subsequent stages within clock period $T_c$, so high speed logic circuits are not necessary.

The following is how to determine and change frequency of the wave. The wave address datum $WA_p(nT)$ is obtained by equation (4). The wave address datum $WA_p(nT)$ increases one by one, when $$D_p(nT) = 1$$

And one complete wave, such as the sinusoidal wave of FIG. 1, is generated by N sample periods. When $$D_p(nT) = 2$$

N sample periods generate two cycles of the wave. When $$D_p(nT) = J$$

J waves are generated during N sample periods. Accordingly, frequency F(J) of the wave can be represented by $$F(J) = (J/NT),$$

wherein T is the sample period. In the case of $N = 2^{18}$ and $T = 28 \mu s$, $$F(J) = 0.1362392 \, J(Hz).$$

J ranges from 0 to $2^{18} - 1$. When $J = 0$, the same sample amount is obtained. This is a DC signal. When $J = 2^{16}$, 4 samples form one wave the frequency of which is 8928 Hz. When $J = 2^{17}$, the frequency is 17,857 KHz.

Figure 6:
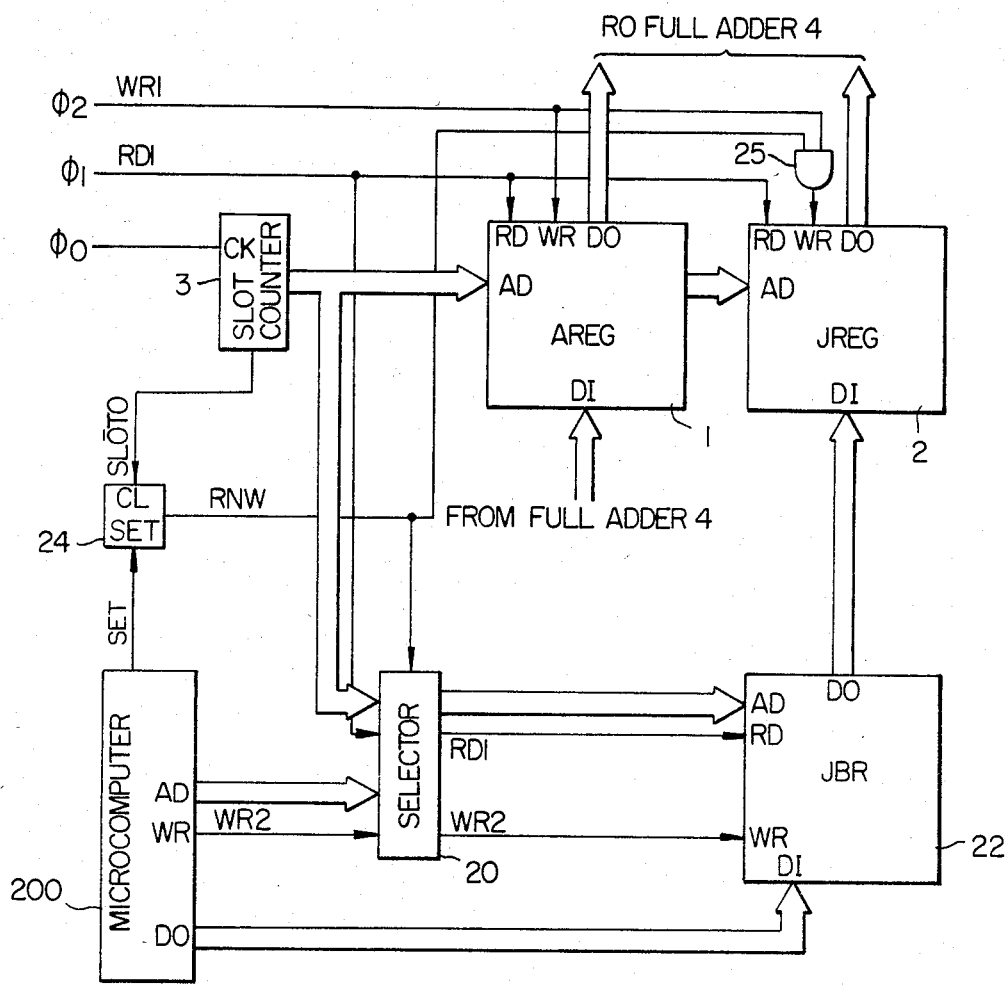
FIG. 6 is a detailed block diagram of an arrangement for frequency data transfer.

The difference address datum $D_p(nT)$ is stored in the JREG2 of FIG. 2. When the frequency F(J) must be changed, the $D_p(nT)$ is rewritten by a microcomputer 200 and a buffer memory 100, referring to FIG. 2. The microcomputer 200 transfers new wave address datum $WA_p(oT)$ and new diference address datum $D_p(oT)$ to the buffer memory 100 at arbitrary timing. After that, the new $WA_p(oT)$ and $D_p(oT)$ are transferred to the AREG1 and the JREG2 at the time slot p. FIG. 6 shows detailed embodiment of the microcomputer 200 and the buffer memory 100. This embodiment transfers only $D_p(xT)$.

Referrring to FIG. 6, 1 is the wave addres register, 2 is the difference address register and 3 is the slot counter, as described in FIG. 2. The output data from the full adder 4 in FIG. 2 is applied to data input terminal DI of the wave address register 1. 22 is a difference address buffer register which stores new difference address data temporarily and is composed of 72 words of memory. Each memory corresponds to a respective time slot p. A selector 20 receives slot number from the slot counter 3, the clock signal $\phi_1$ (RD), address data and a write signal WR2 from the microcomputer 200. When renewal signal RNW is "0", the selector 20 selects the address data and the WR2, and supplies them to the difference address buffer register 22 (JBR). When RNW is "1", the slot number and the RD1 are applied to the JBR.

The clock signal $\phi_0$ counts up slot number of the slot counter 3. This new slot number is applied to the wave address register 1 and the difference address register 2 for designating memories corresponding to the new slot number. After that, the clock signal $\phi_1$ reads out the wave address datum $WA_p(nT)$ and the difference address datum $D_p(nT)$ from the designated memories and supplies them to the full adder 4. After that, the clock signal $\phi_2$ writes output datum $WA_p(nT+T)$ of the full adder 4 into the wave address register 1. When RNW is "0", an AND gate 25 blocks the clock signal $\phi_2$ (WR1) and the difference address datum $D_p(nT) = J$ is not changed. Therefore, a sinusoidal wave of frequency F(J) is generated.

When the frequency F(J) is changed to another F(J'), the following operation is executed. The microcomputer 200 outputs address data corresponding to the slot number and new difference address datum $D_p(oT)$, and further output WR2. The renewal signal RNW is "0". So, the selector 20 selects address datum and WR2. The new difference address datum $D_p(oT)$ are written in the memory of the difference address buffer register 22. When the difference address datum $D_p(nT)$ should be changed for all time slots (p = 0, 1, 2, ..., 71), the microcomputer writes new $D_p(oT)$ (p = 0, 1, 2, ..., 71) to all of the memories in the buffer register 22 corresponding to the slot number p. After that, the microcomputer 200 puts out a SET signal to a renewal controller 24. The slot counter 3 generates a signal SLOT0 when the slot number p = 0. The first signal SLOT0, after the SET signal is generated, will output the RNW signal "1". The second SLOT0 will change the RNW signal to "0" again. Therefore, the RNW signal stays "1" for 72 time slots. When the RNW signal is "1", the difference address buffer register 22 is accessed by the slot counter 3 and the contents of the register 22, i.e. $D_p(oT)$s, are read and put out from output terminals DO at $\phi_1$ (RD1 = 1). The read out data $D_p(oT)$s are written into the 72 memories of the difference address register 2. After that, the RNW signal becomes "0". New difference address data $D_p(oT)$s are read out, at $\phi_1$, from the difference address register 2 and the sample signal of new frequency are calculated.

Figure 7:
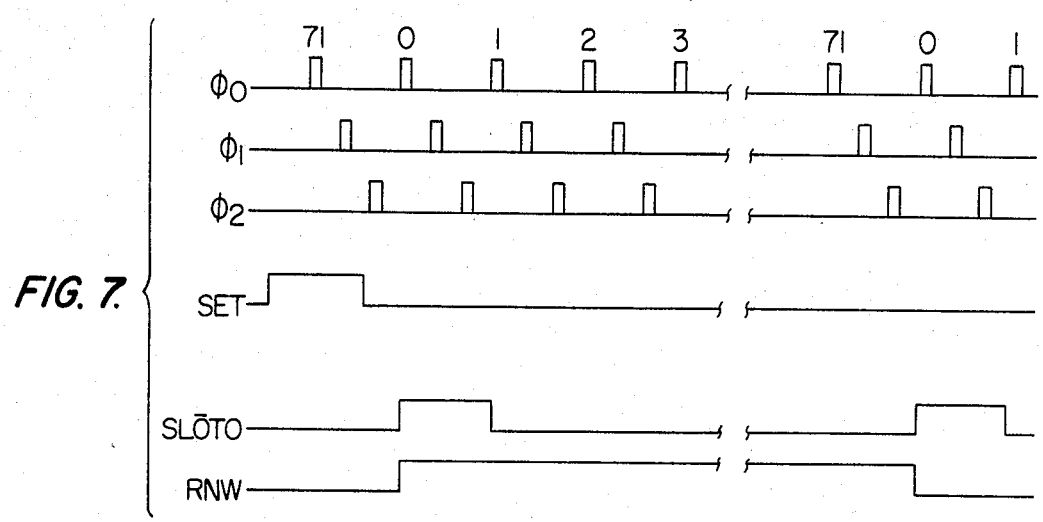
FIG. 7 is a time chart describing operation of data transfer.
Figure 8A:
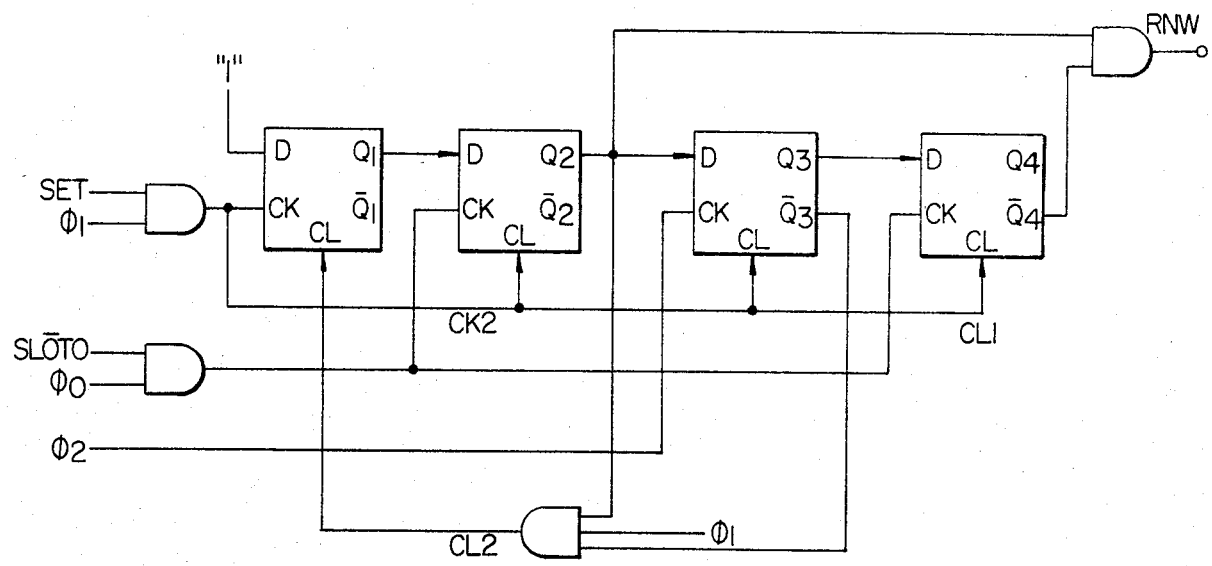
FIG. 8(a) is a logic circuit diagram of an example of a renewal controller.
Figure 8B:
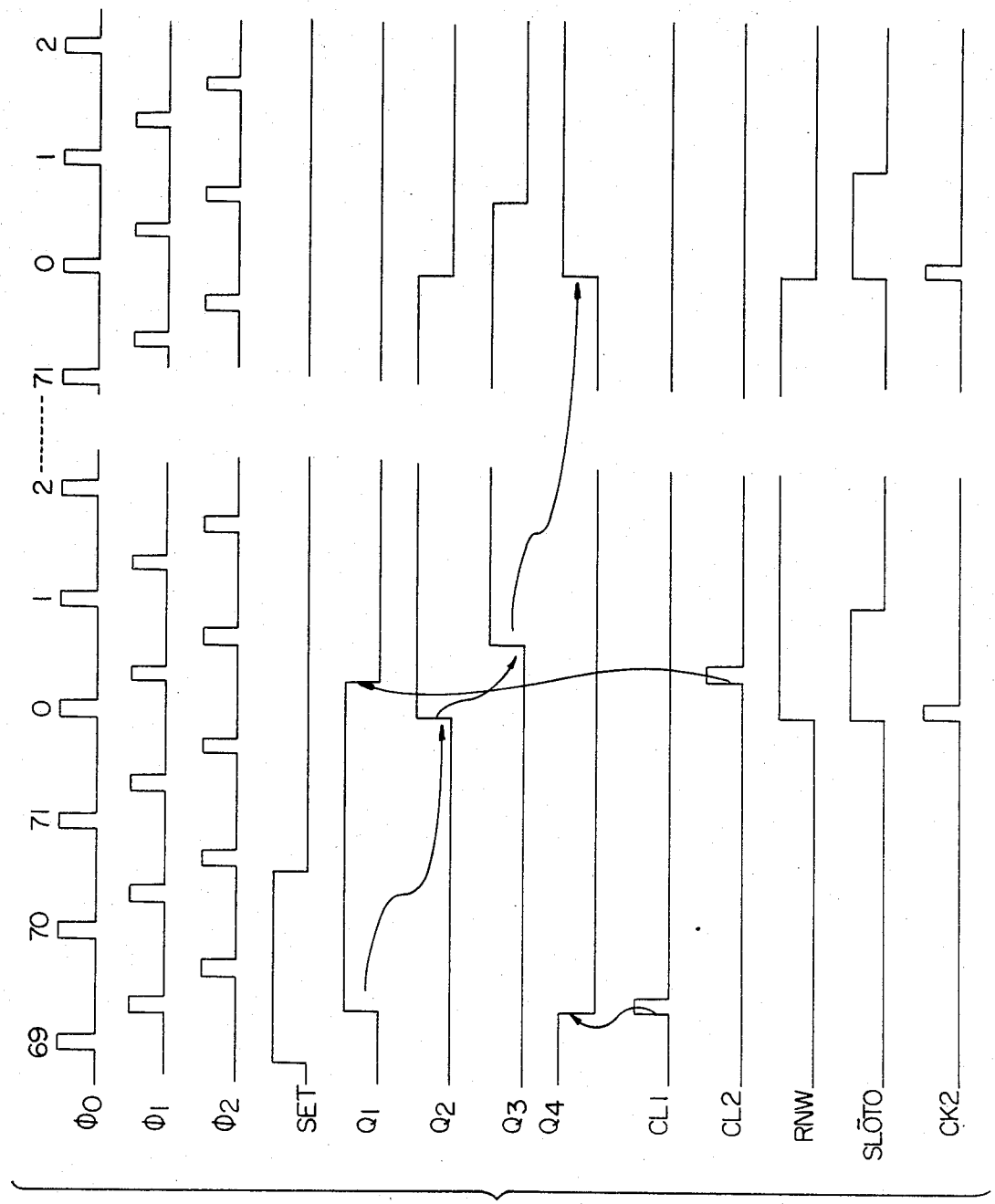
FIG. 8(b) is a time chart of the renewal controller shown in FIG. 8(a)

FIG. 7 shows a time chart of the signals $\phi_0$, $\phi_1$, $\phi_2$, SET, SLOT0 and RNW. FIG. 8(a) shows an example of the renewal controller 24. The renewal controller 24 is composed of 4 D-flipflops and 4 AND gates. FIG. 8(b) is a time chart of the renewal controller 24.

The embodiment of FIG. 6 does not rewrite the wave address data $WA_p(nT)$ to new $WA_p(oT)$, so the phase of the new sinusoidal signal is decided by the last phase of the old sinusoidal signal. The old signal is smoothly connected to the new signal. This is convenient for frequency change of vibrato and portamento effects.

Figure 9:
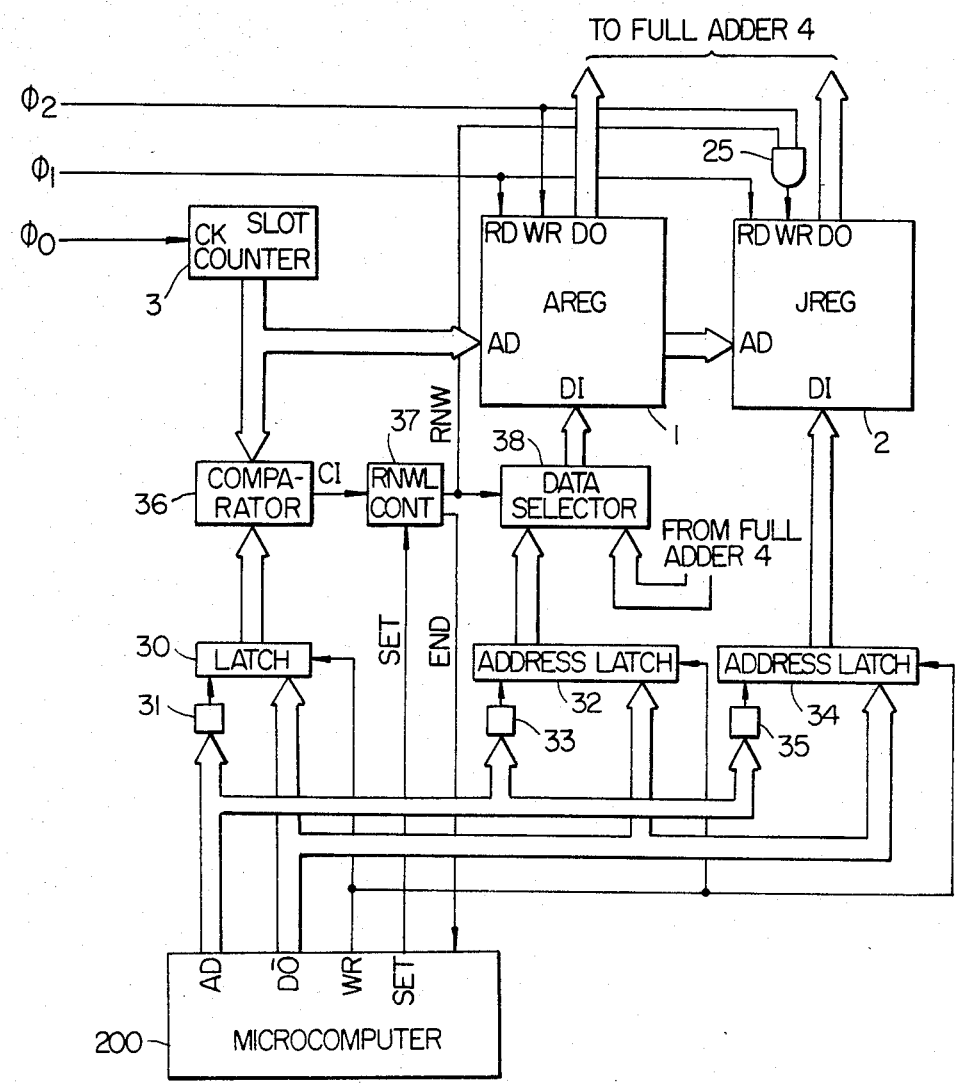
FIG. 9 is another detailed block diagram of an arrangement for frequency data transfer.

When the new frequency signal should start at a predetermined phase, a new wave address data $WA_p(oT)$ must be loaded to the wave address data register 1 as well as $D_p(oT)$ to the difference address data register 2. FIG. 9 shows an embodiment which can load both $WA_p(oT)$ and $D_p(oT)$. Referring to FIG. 9, 30 is a slot number latch, 32 is a wave address latch and 34 is a difference address latch. The data buss and WR signal of the microcomputer 200 are connected to each of the latches 30, 32 and 34. The address signal AD of the microcomputer 200 is decoded in the address decoder 31, 33, 35 and selects one of the latches 30, 32, 34. The microcomputer 200 can select one of the latches 30, 32, 34 and can write the slot number p, the wave address data $WA_p(oT)$, the difference address data $D_p(oT)$ to the respective latches 30, 32, 34 by WR signal. 36 is a comparator which outputs a coincidence signal CI "1" when the output of the slot counter 3 is equal to the slot number in the slot number latch 30. 37 is a renewal controller which generates RNW signal in accordance with the coincidence signal CI and a SET signal from the microcomputer 200. 38 is a data selector selecting one of the data from the full adder 4 and the wave address latch 32. The data selector 38 selects the wave address latch 32 when the RNW is "1".

Figure 11:
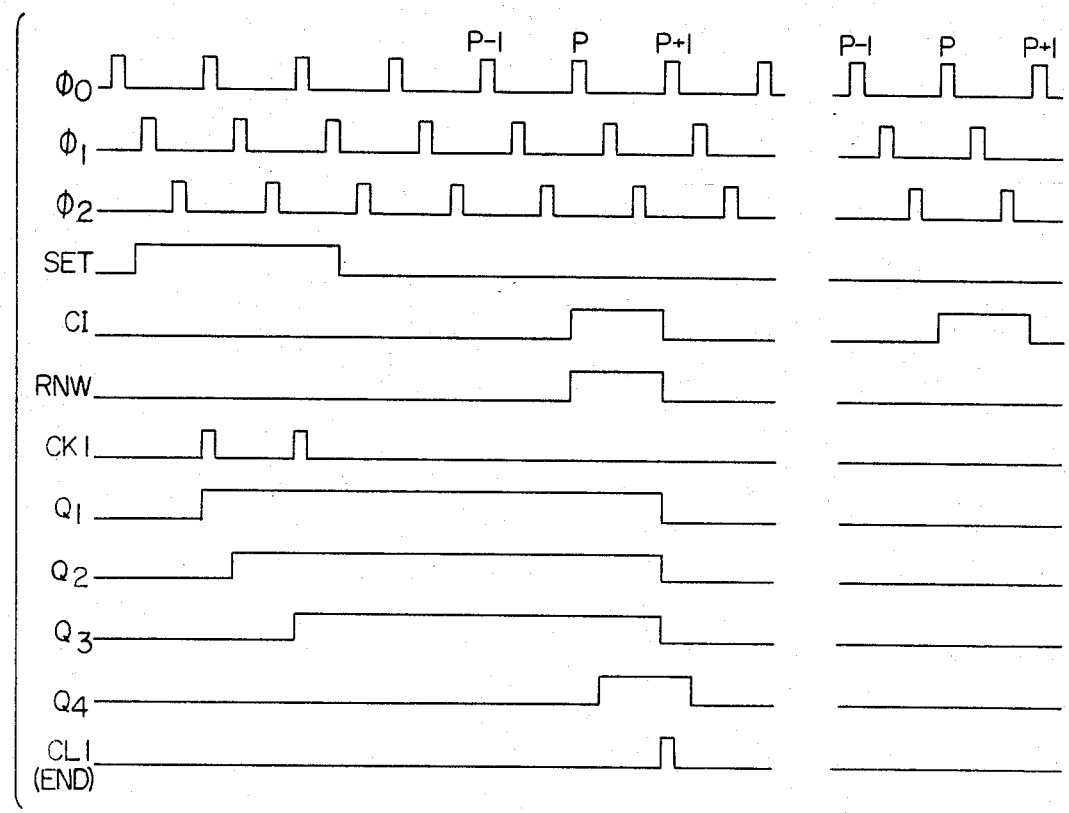
FIG. 11 is a time chart of another renewal controller.

When the SET signal is "0", the RNW is "0". So, the sinusoidal wave is generated regularly the same as described in FIG. 6. If the frequency of the wave in slot number p is to be changed, a slot number p, a wave address datum $WA_p(oT)$ and a difference address datum $D_p(oT)$ are latched in the latches 30, 32, 34. After that, the microcomputer 200 puts out SET signal "1". As shown in FIG. 11, the first coincidence signal CI, after the SET signal is generated, is output as RNW signal. At the time slot when this RNW appears, the new $WA_p(oT)$ is loaded to the wave address register 1 and the new $D_p(oT)$ is loaded to the difference address register 2. When the slot number p is incremented to p+1, the renewal controller 37 generates a signal END and changes the RNW signal to "0". Therefore, at time slot p+1, the wave sample of address $WA_{p+1}(nT)$ is generated. The frequency is not changed in this time slot p+1. The time slot is increased as p+1, p+2, ..., 71, 0, 1, ... and when it becomes p again, then, the wave sample of slot p is generated in accordance with $WA_p(oT)$ and $D_p(oT)$. This wave sample has new frequency of $D_p(oT)=J'$.

The waves start from new wave address, therefore, phase of the wave can be set at will, in the embodiment of FIG. 9. The microcomputer 200 must not load new slot number p', wave address data $WA_{p'}(oT)$ and difference address data $D_{p'}(oT)$ until the END signal generates. The END signal is used as an interrupt signal, for the microcomputer, which informs that data transfer is completed and new data can be loaded to the latches 30, 32, 34.

Figure 10:
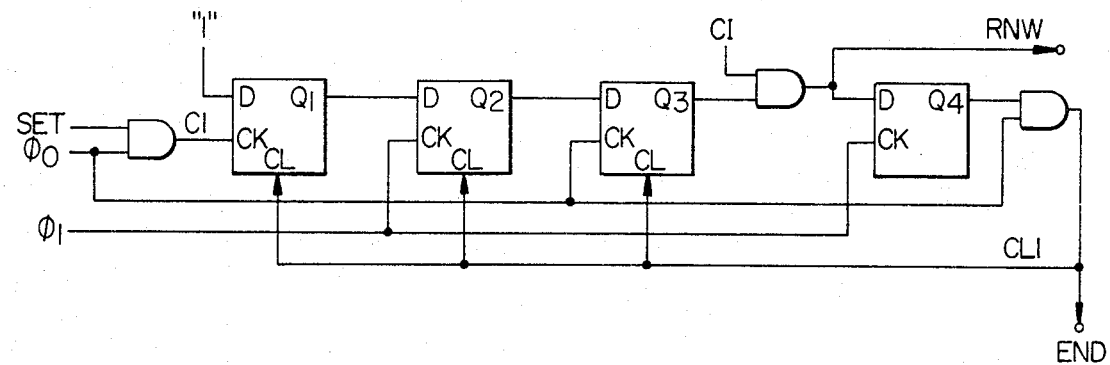
FIG. 10 is a logic circuit diagram of an example of another renewal controller used in the embodiment of FIG. 9.

FIG. 10 shows an example of the renewal controller 37 of FIG. 9. FIG. 11 is a time chart of the renewal controller 37.

The ROM1, ROM2, ROM3 of FIG. 2 and FIG. 3 can be random access memories (RAM). By rewriting the content of these memories, waveforms other than sinusoidal waves can be generated and plural kinds of wave shapes can be generated. The slot number p is 72 in the above description. So, 72 kinds of independent frequency signals can be generated in time-multiplexed way. The number p is not restricted to 72.

Figure 12:
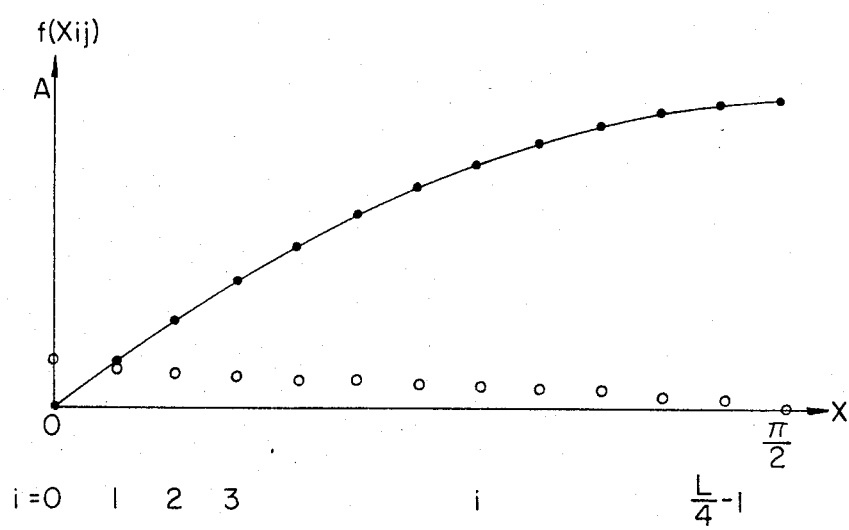
FIG. 12 is a diagram showing sinusoidal wave samples stored in a wave memory.

When the wave form is sinusoidal, the size of memory can be reduced. FIG. 12 shows samples of sinusoidal wave, wherein $i=0-(L/4)$. ROM2 stores digitized data of $$A \sin (2\pi/N) Mi \quad i=0, 1, 2, \ldots, (L/4)$$

as shown by black dots in FIG. 12. ROM1 stores digitized data represented by $$A \left\{ \sin \frac{2\pi}{N} (Mi + M) - \sin \frac{2\pi}{N} Mi \right\}$$

$$i = 0, 1, 2, \ldots, \frac{L}{4}$$

This is shown, in FIG. 12, by white dots.

Figure 13:
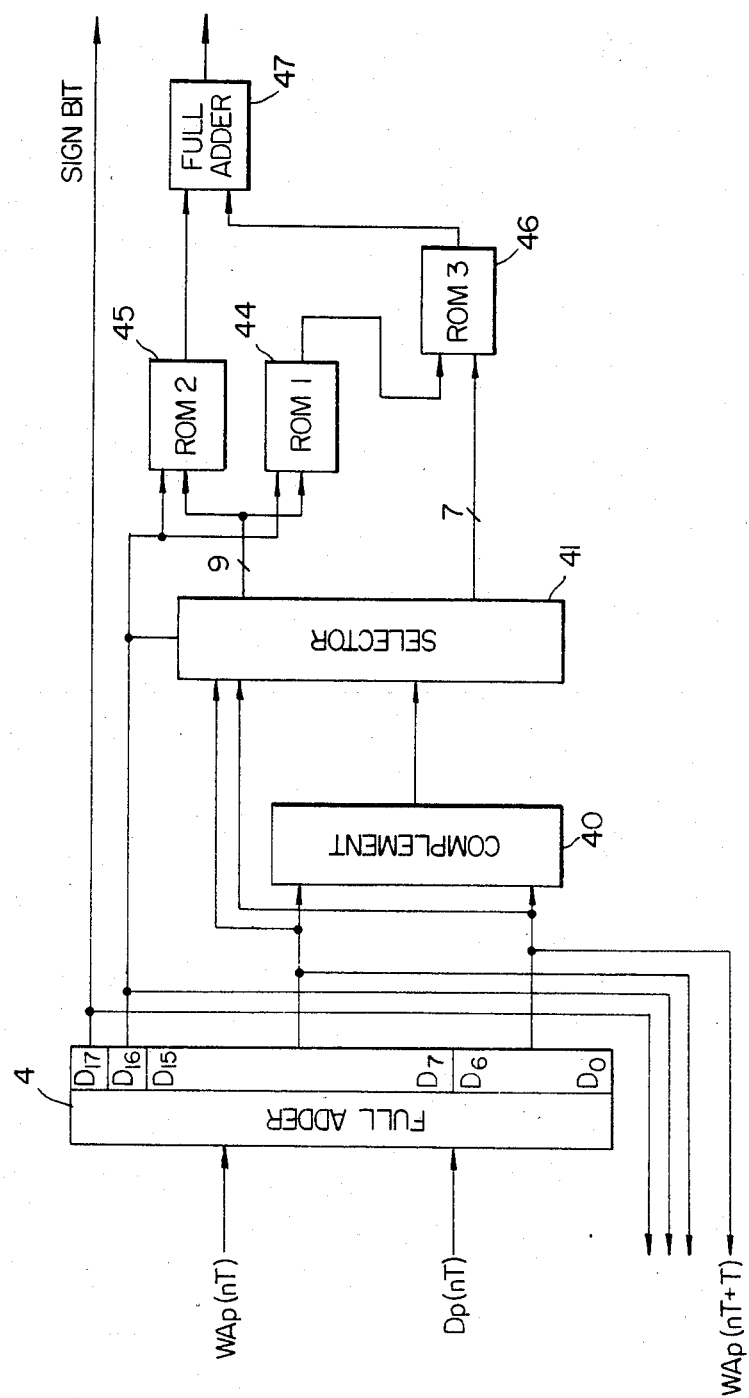
FIG. 13 is a block diagram of an embodiment of a wave calculator.

The circuit shown in FIG. 13 can generate a whole sinusoidal wave from a quarter sinusoidal wave of FIG. 12. Referring to FIG. 13, 4 is a full adder summing $WA_p(nT)$ and $D_p(nT)$. A summed datum $WA_p(nT+T)$ is applied to the wave address register 1. $WA_p(nT+T)$ is composed of 18 bits $D_0-D_{17}$. $D_0-D_6$ is partial address datum. $D_7-D_{17}$ is wave memory address. $D_{17}$ is a sign bit of the sinusoidal wave. $D_{16}$ represents difference of phase area $$\left( 0 - \frac{\pi}{2}, \pi - \frac{3\pi}{2} \right) \text{ and } \left( \frac{\pi}{2} - \pi, \frac{3\pi}{2} - 2\pi \right).$$

$D_7-D_{15}$ respresents $$i = 1 - \left( \frac{L}{4} - 1 \right).$$

$D_0-D_{15}$ is applied to the selector 41. $D_6-D_{15}$ is applied to a complement generator 40. 2's complement of $D_0-D_{15}$ is applied to the selector 41. The selector 41 selects $D_0-D_{15}$ when $D_{16}$ is "0", i.e. phase is $0-(\pi/2)$ and $\pi-(3\pi/2)$. When $D_{16}$ is "1", 2's complement of $D_0-D_{15}$ is selected. Accordingly, selector 41 generates number i increasing and decreasing cyclically between 0 and $(L/4)-1$. $D_{16}$ is applied to the most significant bit of address of ROM1 and ROM2 for reading out $f(x_{ij})$, wherein $i=(L/4)$, $J=0$. $D_{17}$ is used as the sign bit. ROM1 stores positive differential data, so the sign bit is not necessary. Input data of the full adder 47 are only positive numbers. Therefore, the full adder 47 need not be a full adder/subtractor. Wave address N becomes about N/4, so memory size can be reduced to about a quarter of the embodiment in FIG. 2 or FIG. 3.

In the above description, calculation of interpolation is linear. Other interpolations such as 2nd order function or other functions can be applied in the wave calculator. Waveforms other than sinusoids can be generated by storing other data in ROM1, ROM2 and ROM3.

The present invention utilizes an interpolation calculation, therefore, the wave data memory ROM2 (6) is only needed for storing the L sample data of the sinusoidal wave instead of $N=L \times M$ samples. Hence, the amount of data is reduced to one M-th of the former art's amount of data. L, M, N are powers of 2. So the wave memory address is easily separated from the partial address data. Even if L is not so large, N can be very large, so frequency of a wave can be resolved precisely.

The interpolation calculation produces rather accurate wave sample data of original wave shape, so digitized noise contained in the output wave signal is very small and good tone quality is obtainable, compared with the method of rounding or truncating the wave address.

72 time slots are installed and 72 wave address memories and 72 difference address memories are prepared. Therefore, 72 different frequency signals of the same wave can be generated in time-multiplexed way. These 72 signals can be used as fundamental and harmonics of a musical wave signal. These 72 signals are multiplied by envelope signals of every component of the musical wave signal. Therefore, very natural sounds can be synthesized.

While particular embodiments of the invention have been shown and described, it will be apparent to those skilled in the art that numerous modifications and variations can be made in the form and construction thereof without departing from the fundamental principles of the invention. It is, therefore, desired by the following claims, to include within the scope of the present invention all similar and modified forms of the apparatus disclosed, and by which the results of the invention can be obtained.

What is claimed is:

1. A multiple wave generator comprising:
   a wave data memory for storing plural data samples of a wave shape;
   a wave address register storing wave address data for partially designating said sampled data in said wave data memory;
   a difference address register for storing difference address data which are incremental address data;
   a wave address calculator for adding said wave address data to said difference address data and for writing summed data into said wave address register, and for producing a set of new wave memory data and partial address data from said summed data; and
   a wave calculator,
   wherein said wave address data are composed of wave memory address data for addressing said wave data memory and partial address data which designate the interpolated position of said wave memory address, and wherein said wave memory address data are applied to said wave data memory for reading out one of said plural data samples, and wherein said read out data samples and said partial address data are applied to said wave calculator which calculates interpolated wave data samples corresponding to said wave memory address and said partial address.

2. A multiple wave generator as claimed in claim 1, wherein said wave address register and said difference address register have plurality of memories, respectively, whereby each of said memories stores wave address data and difference address data specifying desired frequency of plurality of waves.

3. A multiple wave generator as claimed in claim 1, wherein said wave calculator generates said plural data samples of said wave shape and data samples which have been linearly interpolated between said plural data samples.

4. A multiple wave generator as claimed in claim 3, wherein said calculation of linear interpolation is executed by a pipe line architecture.

5. A multiple wave generator as claimed in claim 1, wherein said wave calculator calculates difference samples of adjacent wave data samples, and multiplies said difference samples by said partial address data and adds said data samples in said wave data memory for linear interpolation.

6. A multiple wave generator as claimed in claim 5, wherein said wave calculator contains a difference wave data memory which stores said difference samples of adjacent wave data samples and is accessed by said wave memory address data.

7. A multiple wave generator as claimed in claim 5, wherein said wave calculator contains a third memory which receives said difference data samples and said partial address data as addressing data and outputs product data of said difference data samples and said partial address data.

8. A multiple wave generator as claimed in claim 5, wherein said difference wave data memory stores difference data samples of a sinusoidal wave and said wave data memory stores a sinusoidal wave.

9. A multiple wave generator as claimed in claim 1, wherein said wave memory address and said partial address are composed of L and M kinds of numbers respectively, where L and M are powers of 2.

* * * * *